United States Patent
Cui et al.

(10) Patent No.: US 10,674,492 B2
(45) Date of Patent: Jun. 2, 2020

(54) DEVICE AND METHOD FOR CONTROLLING WORKING STATE CHANGE OF SMALL CELL

(71) Applicant: Sony Corporation, Tokyo (JP)

(72) Inventors: Qimei Cui, Beijing (CN); Ningyu Chen, Beijing (CN); Jiahui Liu, Beijing (CN); Yingni Zhang, Beijing (CN); Liang Zeng, Beijing (CN); Zhongbin Qin, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/293,644

(22) Filed: Mar. 6, 2019

(65) Prior Publication Data

US 2019/0200346 A1 Jun. 27, 2019

Related U.S. Application Data

(63) Continuation of application No. 15/102,441, filed as application No. PCT/CN2014/094652 on Dec. 23, 2014, now Pat. No. 10,278,162.

(30) Foreign Application Priority Data

Dec. 26, 2013 (CN) .......................... 2013 1 0737660

(51) Int. Cl.
| | |
|---|---|
| *H04W 72/04* | (2009.01) |
| *H04W 52/02* | (2009.01) |
| *H04W 72/10* | (2009.01) |
| *H04W 76/27* | (2018.01) |
| *H04W 72/08* | (2009.01) |

(52) U.S. Cl.
CPC ... *H04W 72/0413* (2013.01); *H04W 52/0212* (2013.01); *H04W 72/042* (2013.01);
(Continued)

(58) Field of Classification Search
CPC ......... H04W 52/0212; H04W 72/0413; H04W 72/042; H04W 72/0486; H04W 76/27;
(Continued)

(56) References Cited

U.S. PATENT DOCUMENTS

| | | | |
|---|---|---|---|
| 8,340,723 B2 | 12/2012 | Rudrapatna | |
| 9,681,374 B2 * | 6/2017 | Cui | .................. H04W 52/0206 |

(Continued)

FOREIGN PATENT DOCUMENTS

| | | | |
|---|---|---|---|
| CN | 102763461 A | | 10/2012 |
| CN | 103200649 A | | 7/2013 |
| CN | 104469817 A | * | 3/2015 |

OTHER PUBLICATIONS

Machine Translation CN-104469817-A.*
International Search Report dated Mar. 27, 2015 in PCT/CN2014/094652, filed Dec. 23, 2014.

*Primary Examiner* — Maharishi V Khirodhar
*Assistant Examiner* — Kenneth P Hunt
(74) *Attorney, Agent, or Firm* — Xsensus LLP

(57) ABSTRACT

A device and method controlling working state change of a small cell and a base station including the device. The device includes: an information acquiring unit that acquires interference between a small cell to be controlled and an adjacent small cell and/or load of the small cell to be controlled; and a state change determination unit that determines working state change to be performed by the small cell to be controlled according to the acquired interference and/or load. The working state includes multiple sleep levels from low to high. A sleep degree of the small cell to be controlled in a low sleep level is less than a sleep degree of the small cell to be controlled in a high sleep level, the working state change being performed among multiple sleep levels.

9 Claims, 11 Drawing Sheets

(52) U.S. Cl.
CPC ..... *H04W 72/0486* (2013.01); *H04W 72/082* (2013.01); *H04W 72/10* (2013.01); *H04W 76/27* (2018.02); *Y02D 70/1242* (2018.01); *Y02D 70/1262* (2018.01); *Y02D 70/164* (2018.01)

(58) Field of Classification Search
CPC ............... H04W 72/10; H04W 72/082; H04W 52/00–0296; Y02D 70/1262; Y02D 70/164; Y02D 70/1242
See application file for complete search history.

(56) References Cited

U.S. PATENT DOCUMENTS

| | | | |
|---|---|---|---|
| 10,278,162 B2* | 4/2019 | Cui | H04W 52/0212 |
| 2011/0077059 A1* | 3/2011 | Kim | H04W 52/0274 455/574 |
| 2011/0096688 A1* | 4/2011 | Sachs | H04W 48/18 370/252 |
| 2013/0244736 A1 | 9/2013 | Ho et al. | |
| 2013/0310048 A1* | 11/2013 | Hunukumbure | H04W 52/0206 455/443 |
| 2014/0170965 A1* | 6/2014 | Li | H04W 28/08 455/7 |
| 2014/0248884 A1* | 9/2014 | Asada | H04W 36/22 455/436 |
| 2014/0313963 A1* | 10/2014 | Aust | H04W 52/0274 370/311 |
| 2014/0370908 A1 | 12/2014 | Lee et al. | |
| 2015/0126209 A1* | 5/2015 | Gloss | H04W 24/08 455/452.1 |
| 2015/0312867 A1 | 10/2015 | Cui et al. | |

* cited by examiner

| Interferences list | | |
|---|---|---|
| Interfered BS | High-Interference BS | High-Interference User |
| Z | A | a, b, c, d, e |
| Y | A | a, b, c, d |
| X | A | c, d, e |
| W | A | d, e |
| V | B | f, g, h, i |
| U | B | f, g, h |
| T | B | j, k |
| S | C | l, m, n, o |
| R | C | m, n |
| Q | C | o, p |
| P | D | q, r, s |
| O | D | r, s |
| M | E | t, u, v |
| L | E | t, v |
| K | F | w, x |

| Interferences list | | |
|---|---|---|
| Interfered BS | High-Interference BS | High-Interference User |
| S | C | l, m, n |
| R | C | m, n |
| Q | C | o, p |
| X | A | c, d, e |
| W | A | d, e |
| P | D | q, r, s |
| O | D | r, s |
| M | E | t, u, v |
| L | E | t, v |
| K | F | w, x |

…

DEVICE AND METHOD FOR CONTROLLING WORKING STATE CHANGE OF SMALL CELL

CROSS-REFERENCE TO RELATED APPLICATIONS

This application is a continuation of U.S. patent application Ser. No. 15/102,441, filed on Jun. 7, 2016, which is based on National Stage Application PCT/CN2014/094652, filed on Dec. 23, 2014, which claims the benefit of priority of the Chinese Patent Application No. 201310737660.3, filed with the Chinese State Intellectual Property Office on Dec. 26, 2013, the entire disclosure of which is incorporated herein by reference.

FIELD OF THE INVENTION

The present invention generally relates to the field of wireless communications, and particularly relates to the advanced long term evolution (LTE-A) technique. More particularly, the present invention relates to an apparatus and method for controlling a change of operation state of a small cell, with respect to the requirement of the critical techniques of LTE-A based on the setting of cells in 3GPP Release 12.

BACKGROUND OF THE INVENTION

LTE is a long term evolution of the technique standard of the Universal Mobile Telecommunications System (UMTS) established by the 3rd Generation Partnership Project (3GPP) organization, and is approved regularly and started in the meeting of 3GPP TSG RAN #26 in December, 2004, in Toronto. An LTE system introduces critical transmission techniques such as Orthogonal Frequency Division Multiplexing (OFDM) and Multiple-Input Multiple-Output (MIMO) of multiple antennas, and increases the spectrum efficiency and data transmission rate significantly. The peak data rate can reach 50 Mbit/s for uplink and 100 Mbit/s for downlink. Further, the system supports various distribution of bandwidth, and thus the distribution of spectrum is more flexible, with the capacity and coverage of the system significantly increased. The architecture of the LTE wireless networks is more flattened, reducing the system delay and reducing the costs for network building and maintaining.

In addition, in LTE-A, in order to acquire sufficient transmission bandwidth (such as 100 MHz) to support higher uplink and downlink peak data rate (such as 1 Gbit/s for downlink and 500 Mbit/s for uplink), the carrier aggregation technique can be adopted to aggregate a plurality of component carriers to obtain high bandwidth transmission.

In LTE R12, small cells are introduced. A small cell is a wireless access node with low power, operates in an unlicensed or licensed spectrum, and can cover a range of 10 m to 200 m. In contrast, the coverage range of a macro cell can reach as much as several kilometers. The small cell fuses techniques of femtocell, picocell, microcell and distributed wireless techniques. The small cell has a very small volume and can be used indoor and outdoor. Generally, the small cell can cover the indoor space of about 10 m or a range of 2 kilometers in the open air. As shown in FIG. 1, where the multiple smaller circles represent small cells and the three relatively larger circles represent macro cells, it can be seen that the small cells are characterized in that they are densely arranged with the coverage ranges crossed with each other.

In the scenario of LTE-A heterogeneous networks, the macro cells realize wide area coverage and the small cells realize Hotpoint coverage.

Considering that a large amount of small cells would appear in the future applications, it becomes more important to enable more effective utilization of energy and network resources in the networks. Of course, it is also necessary to guarantee the communication quality of the user terminals accessing into the cells. The "cells" in the context includes both macro cells and small cells if not specified otherwise.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

In view of the above demand, the present application aims to provide a technical solution which reduces the energy consumption of each cell as much as possible while guaranteeing the communication quality. Specifically, a small cell to be controlled is caused to sleep in different levels, according to the interference degree between the small cell to be controlled and an adjacent small cell, and/or load of the small cell to be controlled or load to be distributed to the small cell, so as to reduce unnecessary energy consumption. Since the macro cell is generally not allowed to sleep, the controlling object herein is the small cell.

According to an aspect of the present invention, an apparatus for controlling a change of operation state of a small cell is provided, including: an information acquiring unit, configured to acquire interferences between the small cell to be controlled and an adjacent small cell, and/or load of the small cell to be controlled or load to be taken on by the small cell to be controlled which is distributed by other cells; and a state change determining unit, configured to determine, based on the interferences and/or the load acquired by the information acquiring unit, a change of operation state to be performed by the small cell to be controlled, wherein, the operation state includes multiple sleep levels from low to high, and the small cell to be controlled has a lighter degree of sleep when it is at a lower sleep level than when it is at a higher sleep level, the change of operation state being performed among the multiple sleep levels.

According to another aspect of the present invention, an apparatus for changing an operation state of a small cell is provided, including: a control signal receiving unit, configured to receive a control signal from the above mentioned apparatus for controlling; and a state changing unit, configured to change, based on the control signal, the operation state of the small cell.

According to still another aspect of the present invention, a base station is further provided, including one of the two kinds of apparatus mentioned above.

According to an aspect of the present invention, a method for controlling a change of operation state of a small cell is provided, including: acquiring interferences between the small cell to be controlled and an adjacent small cell, and/or load of the small cell to be controlled or load to be taken on by the small cell to be controlled which is distributed by other cells; and determining, based on the acquired interferences and/or the load, a change of operation state to be performed by the small cell to be controlled, wherein, the operation state includes multiple sleep levels from low to high, and the small cell to be controlled has a lighter degree of sleep when it is at a lower sleep level than when it is at a higher sleep level, the change of operation state being performed among the multiple sleep levels.

According to other aspects of the present invention, there are further provided computer program codes and computer program product for implementing the above mentioned method for controlling a change of operation state of a small cell, as well as a computer readable storage medium on which computer program codes for realizing the aforementioned method for controlling a change of operation state of a small cell are recorded.

The method for controlling a change of operation state of a small cell of the present application is capable of changing a sleep level of the small cell appropriately according to the interference and/or load status of the small cell, thereby reducing the energy consumption while making use of the network resources effectively.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF THE INVENTION

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

The First Embodiment

Figure 2:
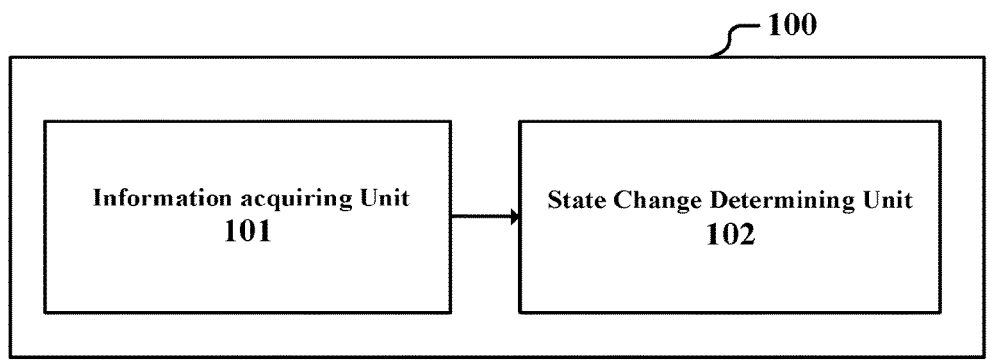
FIG. 2 is a structural block diagram of the apparatus for controlling a change of operation state of a small cell according to an embodiment of the present application.

FIG. 2 illustrates an apparatus 100 for controlling a change of operation state of a small cell according to an embodiment of the present application. As shown in FIG. 2, the apparatus 100 includes: an information acquiring unit 101, configured to acquire interferences between the small cell to be controlled and an adjacent small cell, and/or load of the small cell to be controlled or load to be taken on by the small cell to be controlled which is distributed by other cells; and a state change determining unit 102, configured to determine, based on the interferences and/or the load acquired by the information acquiring unit, a change of operation state to be performed by the small cell to be controlled, wherein, the operation state includes multiple sleep levels from low to high, and the small cell to be controlled has a lighter degree of sleep when it is at a lower sleep level than when it is at a higher sleep level, the change of operation state being performed among the multiple sleep levels.

Specifically, the information acquiring unit 101 can acquire information about two aspects of both the interference and the load or only acquire information about one of the aspects, and provide the acquired information to the state change determining unit 102, so that the state change determining unit 102 is capable of determining, based on the information, whether to change the operation state of the small cell or even how to change the operation state of the small cell, such as turning off or turning on a part of the function of its base station, i.e., sleeping in different degrees. The interferences between the small cell to be controlled and the adjacent small cell are mutual. That is, they include both the interferences the small cell to be controlled produces to the adjacent small cell and the interferences the adjacent small cell produces to the small cell to be controlled.

The information acquiring unit 101 can acquire the above mentioned information by directly detecting the small cell to be controlled in the controlling range of the apparatus 100. Alternatively, it can also be the case that each small cell to be controlled detects respectively and reports the detected information to the information acquiring unit 101. The information about the interference and/or load can be various, and will be described in detail in the following embodiments. Depending on the type and content of the information, the state change determining unit 102 determines the change of operation state to be performed, i.e., the change of sleep of level to be performed, correspondingly.

In the apparatus 100, multiple sleep levels can be set. The lower the sleep level is, the more active the small cell is indicated to be, and the larger the ratio of the function of the base station of the small cell being turned on accounts for. Otherwise, the higher the sleep level is, the smaller the ratio of the function of the base station of the small cell being turned on accounts for.

Figure 3:
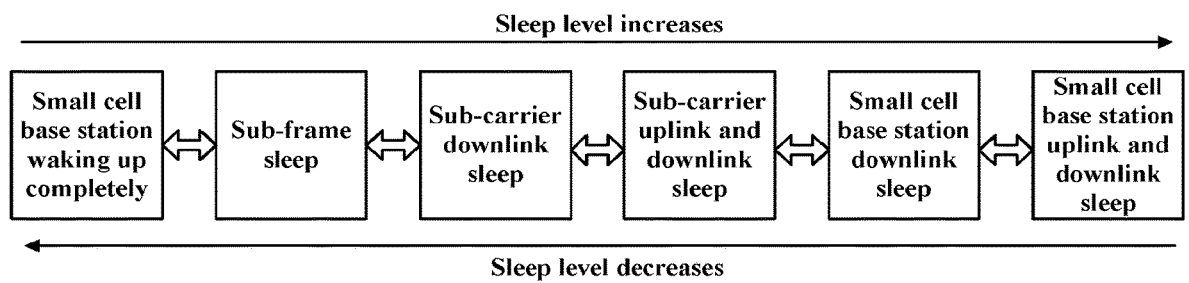
FIG. 3 is a schematic drawing illustrating the sleep levels according to an embodiment of the present application.

In an example, the sleep levels include: small cell base station waking up completely, sub-frame sleep, sub-carrier downlink sleep, sub-carrier uplink and downlink sleep, small cell base station downlink sleep and small cell base station uplink and downlink sleep. As shown in FIG. 3, the sleep level is increased step by step from the small cell base station waking up completely to the small cell base station uplink and downlink sleep.

Wherein, the small cell base station waking up completely means that all sub-frames on all carriers of the base station of small cell are turned on, the sub-frame sleep means that a part of sub-frames on the carriers being turned on are turned off, the sub-carrier downlink sleep means that all the downlink sub-frames on a part of carriers of the base station of the small cell are turned off, the sub-carrier uplink and downlink sleep means that all the uplink sub-frames and downlink sub-frames on a part of carriers of the base station of the small cell are turned off, the small cell base station downlink sleep means that all the downlink sub-frames of the base station of the small cell are turned off, and the small cell base station uplink and downlink sleep means that all the uplink sub-frames and downlink sub-frames of the base station of the small cell are turned off, i.e., turning off the small cell completely. It can be seen that the higher the sleep level of the small cell is, the less its consumed energy is.

In this level setting, the downlink is turned off first in contrast with the uplink. For example, as for the levels of sub-carrier downlink sleep and small cell base station downlink sleep, the downlink is turned off while the uplink remains. For example, as for the small cell base station downlink sleep, on the carriers of the small cell, there is no data communication between the user and the base station. That is, the base station does not transmit information to the user, while the user does not transmit information to the base station as well. However, since the user may transmit the uplink signal such as PRACH or SRS when accessing into other carriers or other cells, the small cell, which is in a state of the small cell base station downlink sleep with the uplink being turned on, can detect the uplink signal of the user. The uplink signal can be used as basis for various measurements and judgments, such as the signal to interference and noise ratio (SINR) measurement of the user and the judgment of the high-interference user terminal.

Therefore, compared with turning off both uplink and downlink, just turning on the uplink while turning off the downlink facilitates the detection of information such as the load and interference within the frequency band by the base station. If both the uplink and the downlink are turned off, it means that the carrier or the small cell no longer detects information of the user terminal. Therefore, the state of turning off the downlink while turning on the uplink can function as a transition state between the full on and the full off, which is used for detecting the operation state of the user terminals in its frequency band.

Although six sleep levels are illustrated herein as an example, the division of the sleep levels is not limited thereto. Instead, various other dividing manners can be adopted. For example, in order to reduce the system complexity, three levels or four levels can be used: small cell base station waking up completely, sub-frame sleep, sub-carrier sleep and small cell base station sleep; or small cell base station waking up completely, small cell base station downlink sleep, and small cell base station uplink and downlink sleep. If the number of levels becomes more, the granularity for controlling can be finer.

The apparatus 100 can be a separate controlling apparatus, and can also be a controlling apparatus located in the base station of a small cell serving as the cluster header or in the base station of a macro cell. The apparatus 100 can control multiple small cells. Further, the apparatus 100 can be located in the base station of each small cell, for determining the change of operation state to be performed by the small cell which it is located in.

In the case that the apparatus 100 is a separate controlling apparatus or located in the base station of a small cell serving as the cluster header or in the base station of a macro cell, the apparatus 100 can further include a transmitting unit, configured to transmit the change of operation state determined by the state change determining unit 102 as a control signal to the small cell to be controlled, so as to control it to perform the change of operation state. In such a situation, the apparatus 100 plays the role of a central controller, and manages the operation state of the multiple small cells in its coverage range.

The Second Embodiment

Figure 1:
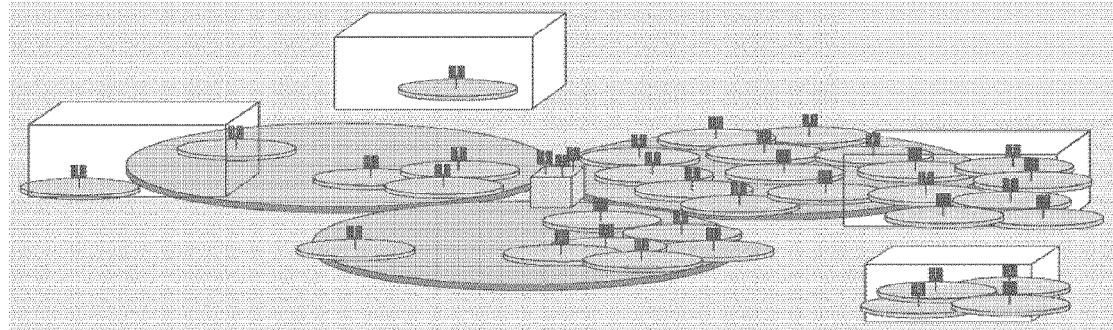
FIG. 1 is a schematic drawing illustrating the spatial distribution in an example of the application scenario including macro cells and small cells.

In the small cell distribution scenario shown in FIG. 1 where there are multiple small cells, one of the small cells may produce interference to another adjacent small cell, and the apparatus 100 can judge the change of operation state of this small cell to be performed according to a degree of the interference.

Figure 4:
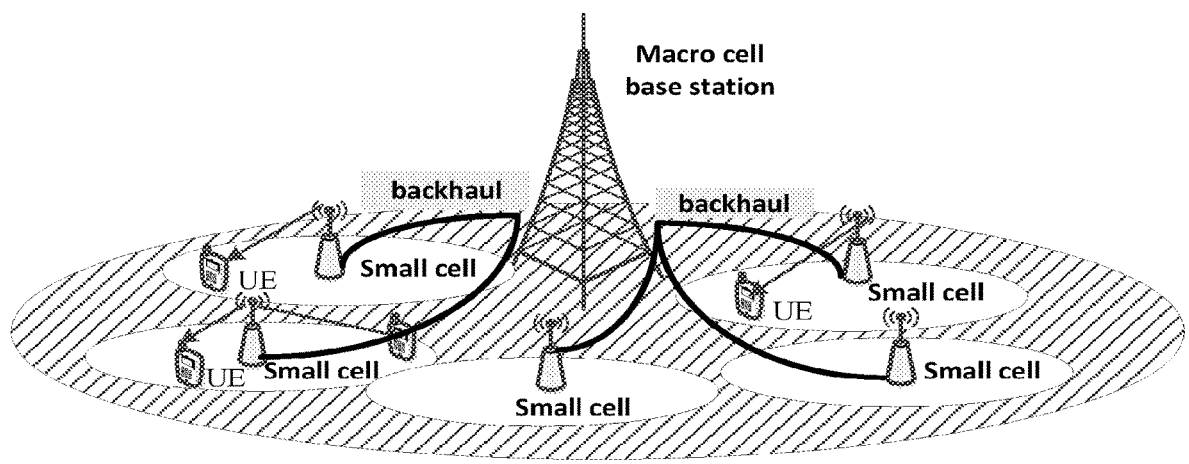
FIG. 4 is a schematic drawing illustrating an example of an application scenario including a macro cell, a small cell to be controlled and its adjacent small cells, and user terminals (UE) in the small cells.

FIG. 4 illustrates the diagram of an example of an application scenario including a macro cell, a small cell to be controlled and the adjacent small cells thereof, as well as the user terminals (UEs) in the small cells. It is to be understood that FIG. 4 is only an example for the purpose of facilitating the understanding of the present application, and the scenarios where the present invention can be applied are not limited thereto.

In an example, the information acquiring unit 101 is configured to acquire the number of high-interference user terminals in the adjacent small cell to determine a degree of interference the small cell to be controlled produced to the adjacent small cell, wherein, the interferences the high-interference user terminal being subjected to from the small cell to be controlled exceed a predetermined limit. Here, the number of the high-interference UEs can be used directly as a value of the degree of interference. It is also possible to map the different numbers of the high-interference UEs to respective level of the degree of interference.

Herein, the information acquiring unit 101 can detect the number of the high-interference UEs by itself, or receive a report about this number from the base station of the small cell to be controlled.

In an embodiment, the information acquiring unit can judge, based on an uplink signal of a user terminal of the adjacent small cell which has been received by the small cell to be controlled, whether the user terminal is a high-interference user terminal. The uplink signal herein includes but is not limited to uplink detecting signal Sounding Reference Signal (SRS), PRACH and uplink control or data signal PUSCH/PUCCH. It should be understood that, the function of the information acquiring unit 101 can be centralized in the apparatus 100 serving as a controller, and can also be distributed in the base station of each small cell. That is, the base station of each small cell performs the judgment for the high-interference user terminal, and reports the judgment result to the apparatus 100.

Figure 5:
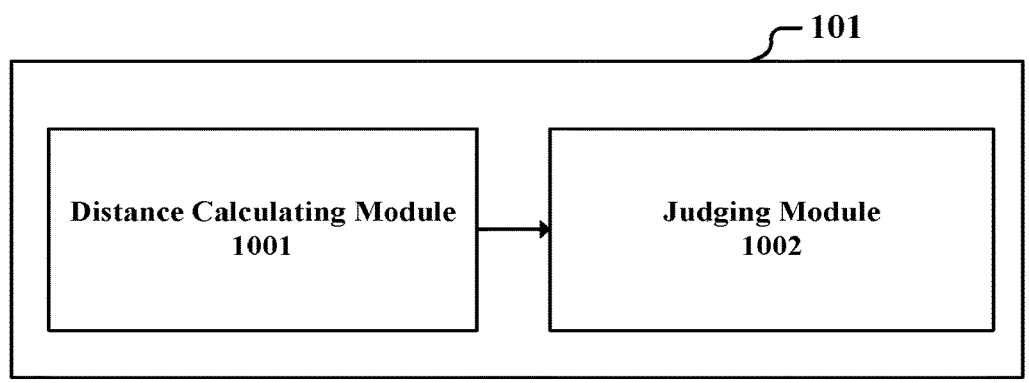
FIG. 5 is a structural block diagram of the information acquiring unit according to an embodiment of the present application.

FIG. 5 illustrates the block diagram of an example of the structure of the information acquiring unit 101. As shown in FIG. 5, the information acquiring unit 101 includes: a distance calculating module 1001, configured to calculate a distance from the user terminal of the adjacent small cell to a base station of the small cell to be controlled; and a judging module 1002, configured to judge the user terminal to be the high-interference user terminal, in the case that a power of the uplink signal is higher than a first predetermined threshold, the distance is smaller than the second predetermined threshold, and the small cell to be controlled makes use of the same spectrum resources as the user terminal does.

Figure 6:
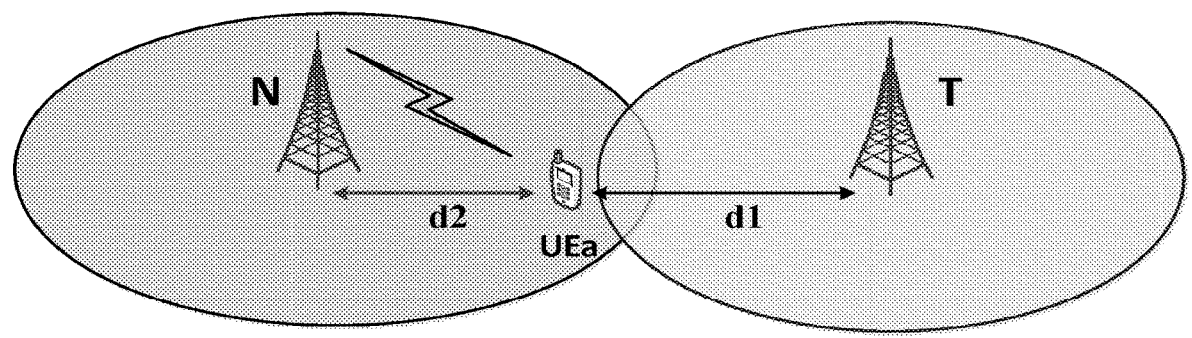
FIG. 6 is a diagram illustrating an example for calculating the distance d1 between the user terminal UEa and the base station T of the small cell to be controlled.

FIG. 6 illustrates an example for calculating the distance d1 between the user terminal UEa and the base station T of the small cell to be controlled. The user terminal UEa is a user of the base station N of the adjacent small cell and the distance to the base station N is d2.

When using the uplink signal SRS or PRACH, the distance calculating module 1001 is configured to calculate an uplink time advance (TA) from the UE to the base station of the small cell to be controlled based on the SRS or PRACH signal, and estimate the distance according to this TA. For example, in the example of FIG. 6, the distance d1 is calculated to be 500 m.

If the distance d1 is smaller than the second predetermined threshold (such as 800 m), the uplink signal SRS or PRACH has a power higher than the first predetermined threshold, and the small cell to be controlled T uses the same spectrum resources as the UEa does, it is evaluated that the UEa transmitting the uplink signal is subjected to strong interferences, and thus the judging module 1002 judges the UEa as a high-interference UE.

Alternatively, when using the uplink signal PUSCH or PUCCH, the distance calculating module 1001 is configured to acquire an uplink TA of the UE from the base station of its serving small cell, add this TA with a time deviation between a timing at which the small cell to be controlled detects the PUSCH/PUCCH signal and an uplink synchronization timing, and take the resulting sum as an uplink TA from the UE to the base station of the small cell to be controlled, so as to estimate the distance according to this TA.

Figure 7:
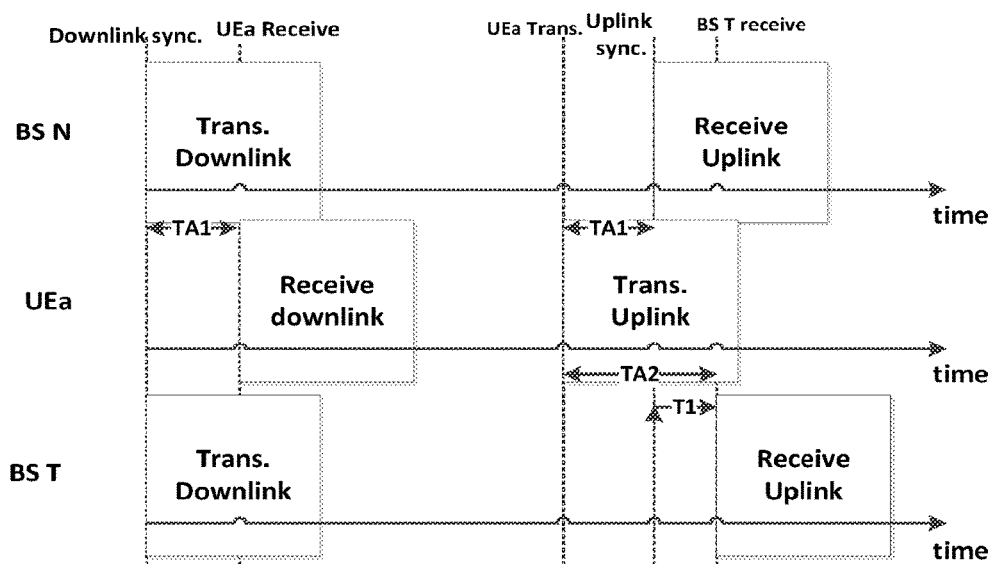
FIG. 7 shows a schematic timing chart for the signal transmitting and receiving among the small cell base stations T, N and the user terminal UEa in FIG. 6.

Taking FIG. 6 as an example, FIG. 7 illustrates the timing chart for the signal transmitting and receiving among the small cell base stations T, N and the user terminal UEa. The uplink time advance of UEa is TA1, and it can be calculated that the distance d2 from UEa to the base station N is 300 m from TA1. The time for the uplink signal PUSCH or PUCCH arriving at the base station N is exactly the uplink synchronization timing. The base station T and base station N are synchronized, and the arriving timing of the uplink signal of UEa detected by the base station N is deviated from the uplink synchronization timing in time, the time deviation being denoted by T1. As shown in FIG. 7, TA2=TA1+T1, TA2 being the uplink time advance from the user terminal UEa to the base station T, from which it can be calculated that the distance d1 from the UEa to the base station T is 500 m.

Similarly, if the distance d1 is smaller that the second predetermined threshold (such as 800 m), the power of the uplink signal PUSCH or PUCCH is higher than the first predetermined threshold, and the small cell to be controlled T uses the same spectrum resources as the user terminal UEa does, it is evaluated that the UEa transmitting the uplink signal is subjected to strong interferences, and thus the judging module 1002 judges the UEa as a high-interference UE.

The above mentioned first predetermined threshold and the second predetermined threshold can be determined according to empirical value or by experiment.

Although two methods for determining the distance from the user terminal to the base station of the small cell to be controlled are shown above, the method for determining the distance is not limited thereto, and various other manners can be adopted. For example, determination can be made based on the position information of Global Positioning System (GPS), or based on the location information of base stations. Since the two methods for determining are known to those skilled in the art, they are omitted here.

In addition, the method for determining the distance from the user terminal to the base station of the small cell to be controlled based on PUSCH or PUCCCH signal and TA of the user terminal described as an example above can be applied to various situations requiring to measure a distance, but not limited to the embodiment specifically described in the application.

In another example, the information acquiring unit 101 can be further configured to acquire a degree of interference the small cell to be controlled produced to the adjacent small cell, which is indicated by at least one of signals of OI (overload indication), HII (high interference indication) and RNTP (relative narrowband transmitting power) from the adjacent small cell.

That is, the information acquiring unit 101 can acquire the interference indicating signal, i.e., the inter-cell interference coordination signal such as OI, HII or RNTP of the X2 interface, to indicate the degree of interference the small cell to be controlled produced to the adjacent small cell, or receive the degree of interference directly from the base station of the small cell to be controlled. For example, the OI, HII or RNTP signal sent to the small cell to be controlled by the adjacent small cell via a feedback channel (such as the X2 interface) indicates that more than 70% of the resources blocks are seriously interfered.

When the information acquiring unit 101 acquires the above mentioned degree of interference, the state change determining unit 102 determines, based on the degree of interference, whether to increase or decrease the sleep level of the small cell to be controlled by one or more levels, the levels to be increased or decreased being determined according to the degree of interference.

In one example, the state change determining unit 102 can be configured to compare the degree of interference with a first threshold and/or a second threshold which is lower than the first threshold, when the degree of interference is higher than the first threshold, the state change determining unit 102 determines to increase the sleep level of the small cell to be controlled by one or more levels, and when the degree of interference is lower than the second threshold, the state change determining unit 102 determines to decrease the sleep level of the small cell to be controlled by one or more levels.

For example, when the degree of interference is higher than the first threshold by more than a limit A, it is to increase the sleep level by one level, and when the degree of interference is higher than the first threshold by more than a limit B (B>A), it is to increase the sleep level by two levels, and so on. Likewise, for example, when the degree of interference is lower than the second threshold by more than a limit C, it is to decrease the sleep level by one level, and when the degree of interference is lower than the second threshold by more than a limit D (D<C), it is to decrease the sleep level by two levels, and so on.

In addition, it is also possible to establish the correspondence between the degree of interference and the sleep level. In other words, for example, when the degree of interference is within a first range, the small cell enters into "the small cell base station waking up completely", and when the degree of interference is within a second range, the small cell enters into "the sub-frame sleep", etc, and so on.

In the above, the situation where the information of degree of interference the small cell to be controlled produced to the adjacent small cell is described. Since the interferences are mutual, the information acquiring unit 101 can also acquire information of the degree of interference the adjacent small cell produced to the small cell to be controlled. For example, in the case of the user terminal UEa being a high-interference UE of the base station of the small cell to be controlled T, the information that the user terminal UEa of the adjacent small cell base station N produces high interference to the base station T is acquired correspondingly in the meantime. For example, the above information can be acquired for each small cell base station and be collected in the apparatus 100 serving as a controller, so as to obtain a list of a high-interference UE, the base station it belongs to and the base stations being interfered by it. This list can be stored in the apparatus 100, and can also be stored in a separate database. Based on this list, small cells producing high interferences to other small cells such as small cells whose user terminals produce high interference to multiple small cell base stations can be searched, and/or small cells subjected to high interferences from other small cells such as small cells whose user terminals are high-interference UEs of multiple adjacent small cells can be searched, so that the state change determining unit 102 increase the sleep level of these small cells according to the searching result. Specific examples of this list and its application will be described in detail later with reference to FIGS. 20-21.

After the state change determining unit 102 determines the change of sleep level to be performed, if the apparatus 100 is located in the base station of the small cell to be controlled, the base station changes its sleep level base don the determined change. If the apparatus 100 is a controlling apparatus controlling multiple small cell base stations, it is possible to transmit the corresponding control signal to the small cell to be controlled by the transmitting unit in the apparatus 100, so as to control it to perform the change of the sleep level.

The transmitting of the control signal can use a 1-bit signal realization scheme. That is, the control signal only occupies 1 bit, and the 1 bit binary data is used to indicate to increase or decrease the sleep level by one level. For example, 0 denotes increasing by one level and 1 denotes decreasing by one level.

A N-bit signal realization scheme can also be used. That is, the control signal occupies N bits, and the N-bit binary data is used to denote each operating state respectively, wherein $N>=2$. Considering N-bit binary data can indicate $2^N$ states at most, in the case of setting 6 sleep levels, N can be 3. For example, 000, 001, 010, 011, 100 and 110 can be allocated to the above mentioned six sleep levels.

The Third Embodiment

In this embodiment, the information acquiring unit 101 is configured to acquire load of the small cell to be controlled or the load to be taken on by the small cell to be controlled which is distributed by other cells. The state change determining unit 102 can determine, based on the load, the change of operation state to be performed by the small cell to be controlled. Similarly, the information acquiring unit 101 can detect the above mentioned load by itself, and can also receive the report about the load from each small cell base station.

To be noted, although not pointed out explicitly, the information acquiring unit 101 can further have the configuration described in the first embodiment. At this time, the state change determining unit 102 can determine the change of operation state to be performed by the small cell to be controlled based on the acquired interference and/or load. In other words, the determination can be made based individually on the interference or individually on the load, and can also be made based on both the interference and the load.

When there are two factors of the interference and the load, it can be determined whether to increase or decrease the sleep level of the small cell to be controlled by one or more levels based on the interference and the load. If the changing trends of the operation state determined based on the interference and the load respectively are identical, according to an example of the invention, it is possible to follow the one for which the determined degree of change of the sleep level is larger. For example, if the sleep level of the small cell to be controlled should be increased by 2 levels based on the load, and the sleep level of the small cell to be controlled should be increased by 3 levels based on the interference, it is determined that the sleep level of the small cell to be controlled is to be increased by 3 levels. If the changing trends of the operation state determined based on the interference and the load are opposite, in a preferred example of the invention, the decision based on the load can be followed. Furthermore, it is also possible to perform adjustment based on the conditions of the interference, on the basis of the decision made according to the load. For example, if the sleep level of the small cell to be controlled should be decreased by 2 levels based on the load, and the sleep level of the small cell to be controlled should be increased by 1 level based on the interference, it is determined that the sleep level of the small cell to be controlled is to be decreased by only one level.

In an example, the information acquiring unit 101 is configured to acquire load of the small cell to be controlled within a predetermined time period, and the state change determining unit 102 is configured to determine whether to increase or decrease the sleep level of the small cell to be controlled by one or more levels based on the load, wherein, the number of levels to be decreased or increased is determined according to the conditions of the load. For example, when the load is higher than a first limit of load, the sleep level is decreased by 1 level, and when the load is higher than a second limit of load, the sleep level is decreased by 2 levels, and so on, vice versa.

Specifically, the information acquiring unit 101 cab be configured to acquire the number of user terminals with a high signal-to-noise ratio which are served by the small cell to be controlled within the predetermined time period so as to determine the load, wherein, the user terminals with a high signal-to-noise ratio are the following ones: the signal-to-noise ratio of an uplink signal which a base station of the small cell to be controlled received from the user terminal exceeds a predetermined threshold.

Wherein, the above mentioned uplink signal can be SRS or PRACH signal. Here, the user terminal with a high signal-to-noise ratio denotes the important load of the small cell base station. Therefore, it is possible to evaluate the load conditions of the small cell base station according to the number of the user terminals with a high SNR. If the number is larger, it implies that the load of the small cell is higher and it is necessary to decrease the sleep level thereof. It is possible to directly set the sleep level to be changed to according to the number, or determine the number of levels to be changed according to the extent the number exceeding a predetermined value.

In another example, the information acquiring unit 101 is configured to acquire user terminals or carriers to be distributed to the small cell to be controlled from other cells as the load to be distributed, and the state change determining unit 102 is configured to decrease the sleep level of the small cell to be controlled by one or more levels when the load to be distributed exceeds a predetermined amount, and the number of levels to be decreased depends on the amount of the load to be distributed.

The "other cells" include both other small cells and macro cells. The macro cell detects the utilizing ratio of PDSCH resources in several carriers thereof. If the utilizing ratio of PDSCH resources in a certain carrier exceeds a predetermined percentage, such a carrier is a carrier to be distributed. That is, the users in the coverage range of the small cell to be controlled which use this carrier to communicate can be distributed to the small cell to be controlled. Therefore, the information acquiring unit 101 can be configured to acquire the number of carriers of a macro cell to be distributed which cover the small cell to be controlled, and when the number exceeds a predetermined value, the state change determining unit 102 can determine to decrease the sleep level of the small cell to be controlled by one or more levels. This is because that the small cells covered by more carriers to be distributed of the macro cell can distribute the load of the macro cell more effectively.

Specifically, the macro cell can transmit a reference signal on each carrier to be distributed, so that the small cell to be controlled can detect the number of received carriers to be distributed by this reference signal.

Figure 8:
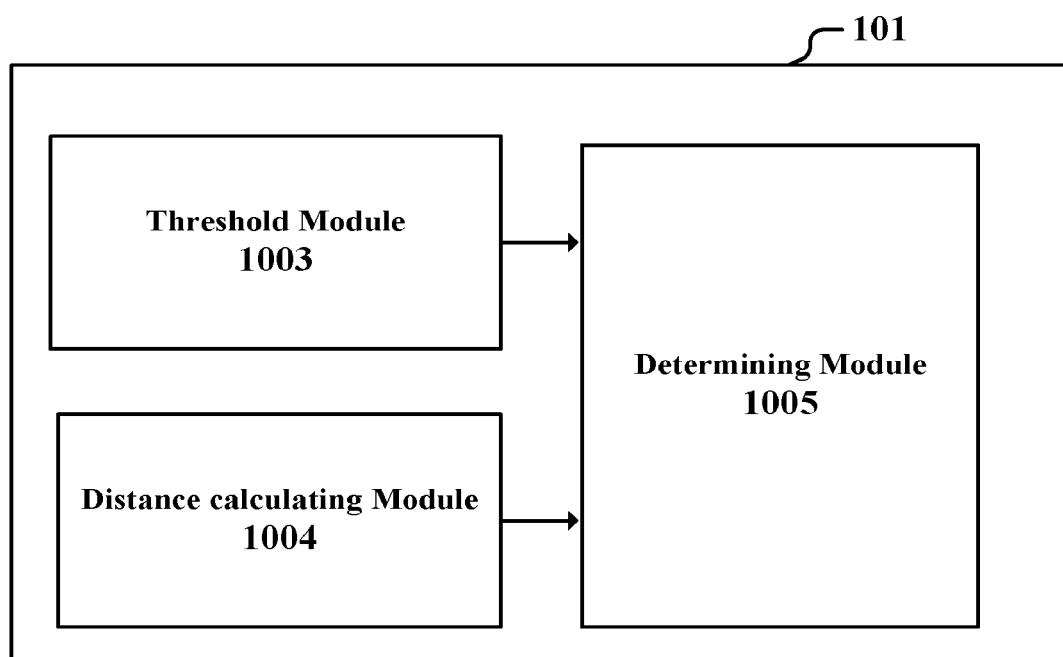
FIG. 8 is a structural block diagram of the information acquiring unit according to another embodiment of the present application.

FIG. 8 illustrates a structural block diagram of another example of the information acquiring unit 101. As shown in FIG. 8, the information acquiring unit 101 includes: a threshold module 1003, configured to judge whether an intensity of the uplink signal from the user terminal of the other cells exceeds a predetermined range; a distance calculating module 1004, configured to calculate a distance from the user terminal to a base station of the small cell to be controlled, in the case that the intensity of the signal exceeds the predetermined range; and a determining module 1005, configured to determine, in the case that the distance is shorter than a predetermined distance, the user terminal to be the load to be distributed.

The uplink signal can be SRS, PRACH signal or PUSCH, PUCCH signal. The distance calculating module 1004 can perform the calculation in the same way as that of the distance calculating module 1001 described above with reference to FIG. 5 to FIG. 7, which will be omitted here. Further, it is to be noted that although FIG. 8 only illustrates the threshold module 1003, the distance calculating module 1004 and the determining module 1005 for determining the load to be distributed, it can also include the distance calculating module 1001 and the judging module 1002 for judging a high-interference user terminal shown in FIG. 5. Moreover, the output results of the determining module 1005 and the judging module 1002 can also be adopted correspondingly in accordance with the principle for changing the sleep level in the case of considering both factors of interference and load as stated above according to requirement.

Figure 9:
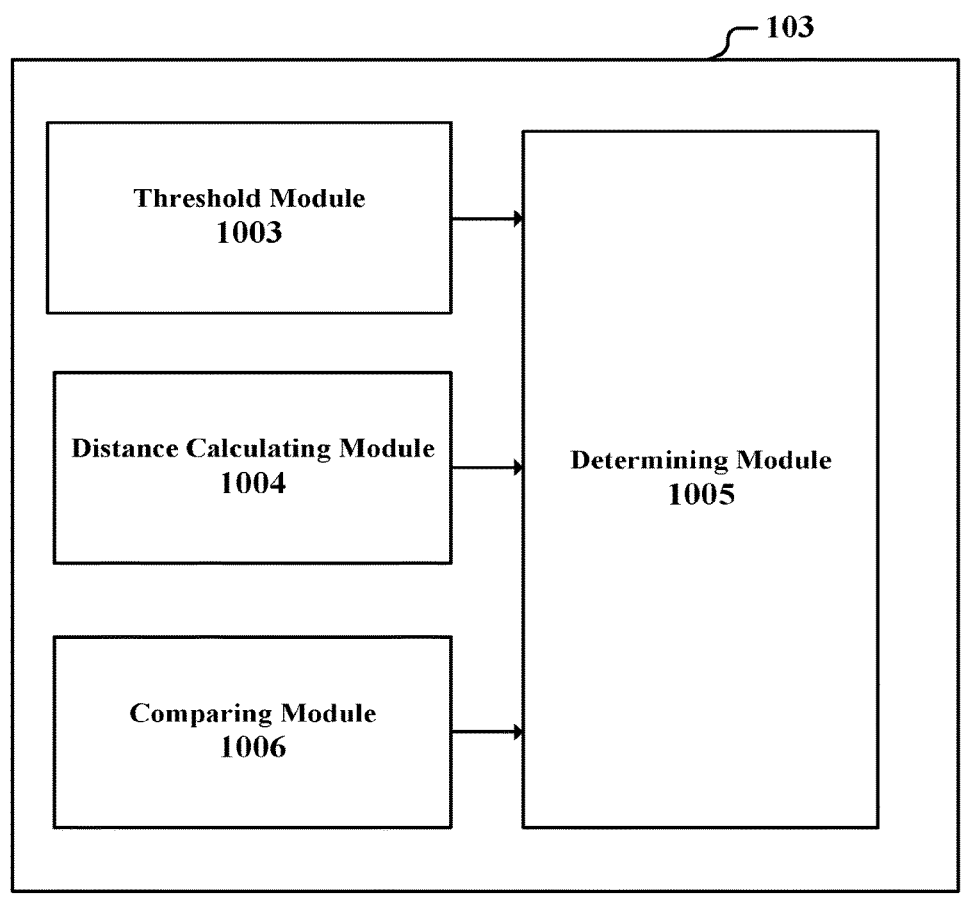
FIG. 9 is a structural block diagram of the information acquiring unit according to still another embodiment of the present application.

Further, FIG. 9 illustrates a structural block diagram of another example of the information acquiring unit 101. Besides each of the modules in FIG. 8, the information acquiring unit 101 further includes a comparing module 1006, configured to compare signal power detected by the small cell to be controlled from the user terminal with signal power detected by the other cells from the user terminal, and the determining module 1005 is further configured to determine, in the case that the signal power detected by the small cell to be controlled is higher than the signal power detected by the other cells, the user terminal to be the load to be distributed.

In addition, in the case of storing the list of a high-interference UE, the base station it belongs to and the base stations being interfered by it as stated above, small cells producing high interferences to other small cells are searched. It can be understood that after increasing the sleep level of such a small cell, the adjacent small cell interfered by it most (for example, with the most high-interference UEs) would become the preferred distributing destination to which the base station of the small cell releases load. Therefore, when the decision of increasing the sleep level of the small cell is made, it is possible to pre-estimate the load to be distributed to the adjacent small cell base station according to the decision, and thus determine to decrease the sleep level of the adjacent small cell simultaneously.

As described above, in the above example, besides the interference with the adjacent small cells, it is also possible to determine the change of operation state to be performed according to the load conditions of the small cell to be controlled, or it is possible to make the determination based individually on the load conditions of the small cell to be controlled.

The Fourth Embodiment

Figure 10:
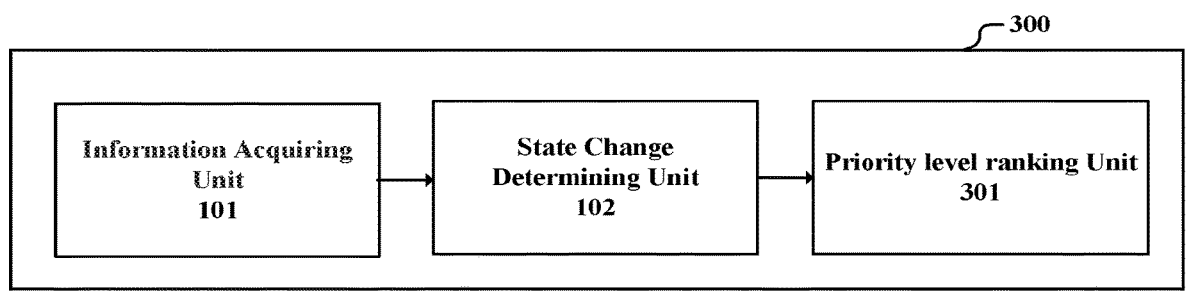
FIG. 10 is a structural block diagram of the apparatus for controlling a change of operation state of a small cell according to another embodiment of the present application.

FIG. 10 illustrates a structural block diagram of the apparatus 300 for controlling a change of operation state of a small cell according to another embodiment of the present application. As shown in FIG. 10, besides the information acquiring unit 101 and the state change determining unit 102 described with reference to FIG. 2 in the first embodiment, the apparatus 300 further includes a priority level ranking unit 301, configured to rank, in the case that it is determined there are multiple small cells to be controlled whose operation state is to be changed by the state change determining unit 102, priority levels for changing their state. In addition, although not shown in FIG. 10, the apparatus 300 can further include a transmitting unit.

The priority level ranking unit 301 can be configured to rank in accordance with conditions such as the load, the interference or the like of each small cell to be controlled.

Specifically, in one example, the priority level ranking unit 301 is configured to rank in accordance with the load of each small cell to be controlled or the load to be taken on by each small cell to be controlled which is distributed by other cells, wherein, the smaller the load is, the higher the priority level of increasing the sleep level of this small cell to be controlled is, and the larger the load is, the higher the priority level of decreasing the sleep level of this small cell to be controlled is.

The load can include the number of users with a high signal to noise ratio, the number of user terminals to be distributed or the number of carriers to be distributed as described in the third embodiment and so on, and will not be repeated here. For example, the small cells to be controlled can be ranked according to the amount of their respective load, so as to obtain the priority level ranking for changing the sleep level of the small cells to be controlled.

In addition, the priority level ranking unit 301 can be configured to rank in accordance with a degree of interference between each small cell to be controlled and its adjacent small cell, wherein, the higher the degree of interference is, the higher the priority level of increasing the sleep level of this small cell to be controlled is, and the lower the degree of interference is, the higher the priority level of decreasing the sleep level of this small cell to be controlled is. The interference here includes at least one aspect of the interference the small cell to be controlled produced to the adjacent small cell and the interference the adjacent small cell produced to the small cell to be controlled.

The degree of interference can include the degree of interference indicated by the number of high-interference user terminals, OI, HII, or RNTP signal as described in the second embodiment, and will not be repeated here.

The priority level ranking unit 301 can further be configured to rank in accordance with a feedback bandwidth or a transmission delay between each small cell to be controlled and a macro cell, wherein, the larger the feedback bandwidth is or the smaller the transmission delay is, the higher the priority level of decreasing the sleep level of this small cell to be controlled is, and the smaller the feedback bandwidth is or the larger the transmission delay is, the higher the priority level of increasing the sleep level of this small cell to be controlled is.

This configuration is based on the idea of firstly choosing base stations with a higher feedback rate or a smaller transmission delay to operate. Specifically, if the feedback bandwidth between the small cells and the macro cell can be known when establishing the networks initially, the priority level ranking is set according to the ranking of the feedback bandwidth. Otherwise, each small cell transmits signal to the macro cell while requesting a reply, and the time interval between transmitting the signal and receiving the reply represents the transmission delay. The priority level ranking is set according to the ranking of the delay.

In addition, the priority level ranking unit 301 can be further configured to rank in accordance with the number of user terminals which use the carrier of each small cell to be controlled as the primary component carrier (PCC) and the number of user terminals with double connections of connecting with a base station of a macro cell and with the small cell to be controlled, wherein, the more the number of user terminals which use the carrier of each small cell to be controlled as the primary component carrier is, the lower the priority level of increasing the sleep level of this small cell to be controlled is, and the more the number of user terminals with double connections is, the higher the priority level of increasing the sleep level of this small cell to be controlled is.

In other words, the larger the number of users using the carrier of the small cell to be controlled as the PCC is, the lower the priority level of making the carrier sleep is. For example, when the number of users exceeds a certain amount, this carrier of the small cell base station is not allowed to sleep.

On the other hand, if the number of users within the small cell to be controlled connecting the base station of the macro cell and the base station thereof is large, it is possible to consider increasing its sleep level preferentially.

By incorporating the priority level ranking unit 301, in the case of there being multiple small cells to be controlled whose sleep level is to be changed, it is possible to perform operation by preferentially choosing the small cells to be controlled whose sleep level is most required to be changed according to a certain strategy.

The Fifth Embodiment

Figure 11:
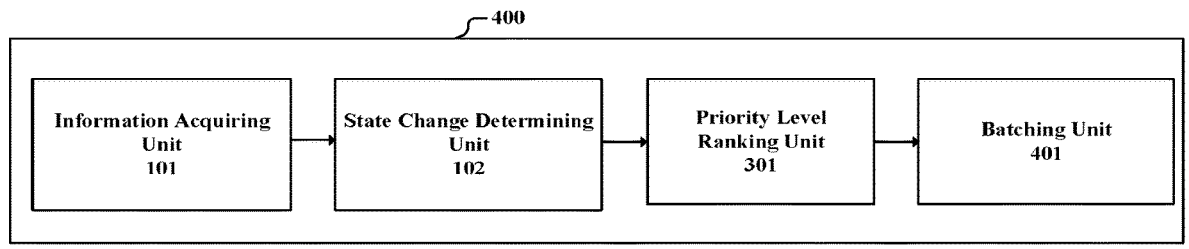
FIG. 11 is a structural block diagram of the apparatus for controlling a change of operation state of a small cell according to still another embodiment of the present application.

FIG. 11 illustrates a structural block diagram of the apparatus 500 for controlling a change of operation state of a small cell according to another embodiment of the present application. As shown in FIG. 11, besides the respective units described with reference to FIG. 10 in the fourth embodiment, the apparatus 400 further includes a batching unit 401, configured to change, according to the ranking acquired by the priority level ranking unit 301, the operation state of each small cell to be controlled in batches, wherein, each unit in said apparatus 400 re-perform corresponding operations after the operations state of each batch of the small cells to be controlled are changed.

For example, when the state change determining unit 102 determines there are several such as 50 small cell base stations whose sleep level is to be increased by one level, and the priority level ranking is performed with respect to these 50 small cell base stations in accordance with the number of high-interference UEs. For example, the sleep control signal can be transmitted to the first batch of 10 small cell base stations, i.e., the 10 small cell base stations with the most high-interference UEs. Thereafter, detecting, ranking and transmitting signals correspondingly are performed again. The operations cycle, until no small cell base stations requiring changing the sleep level thereof exist.

The Sixth Embodiment

Figure 12:
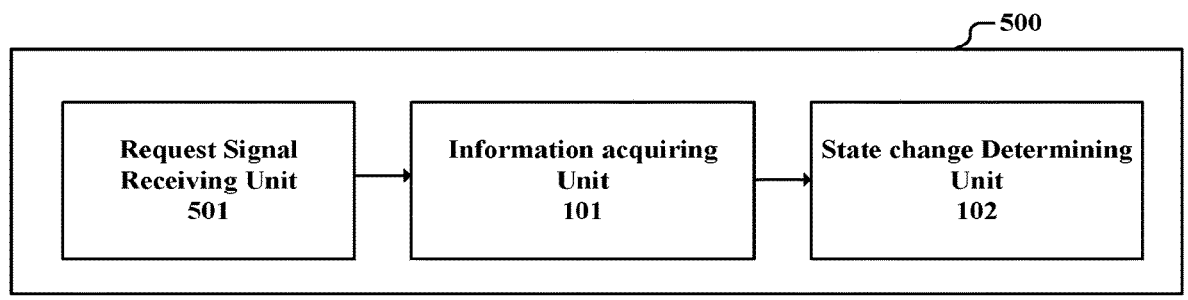
FIG. 12 is a structural block diagram of the apparatus for controlling a change of operation state of a small cell according to another embodiment of the present application.

FIG. 12 illustrates a structural block diagram of the apparatus 500 for controlling a change of operation state of a small cell according to still another embodiment of the present application. Besides the respective units described with reference to FIG. 2 in the first embodiment, the apparatus 500 further includes a request signal receiving unit 501, configured to receive, from the small cell to be controlled, a signal requesting to change the operation state thereof. It is to be understood, although not shown in FIG. 12, the apparatus 500 can further include the other units described in the fourth and the fifth embodiment as well as the transmitting unit.

In the first embodiment to the fifth embodiment, the apparatus 100, 300 and 400 can instruct a small cell to change its sleep level. That is, the apparatus 100, 300 and 400 explores the small cells within its management range on its own to determine whether there is a small cell whose sleep level is to be changed. If it determines that there is such a small cell, that is, the state change determining unit 102 determines to perform the change of the operation state, it transmits a control signal to the related small cell to instruct it to change the operation state.

However, in this embodiment, it is the small cell who requests to change the sleep level of itself. In this situation, the small cell acquires the interference and load conditions related to itself, and determine whether it is necessary to change the sleep level. For example, the small cell base station is provided with the apparatus 100, 300 or 400. If the small cell considers that it is necessary to change the sleep level, it transmits the request signal to the apparatus 500. Preferably, the request signal contains adjusting suggestion of the sleep level, the relevant interference or load conditions. Upon the apparatus 500 receives the request signal via the request signal receiving unit 501, it acquires the control signal as stated in the above mentioned first embodiment to the fifth embodiment, and transmits the control signal to the above mentioned small cell via the transmitting unit.

Generally speaking, the apparatus 500 can be a separate controlling apparatus, and can also be located in the base station of the cluster header or the macro cell. The apparatus can control multiple small cells.

The Seventh Embodiment

The structure and function of the apparatus for controlling the change of operation state of a small cell have been described above. The configuration of the apparatus for changing operation state of the small cell on the small cell side will be described with reference to FIG. 13 to FIG. 15 below.

Figure 13:
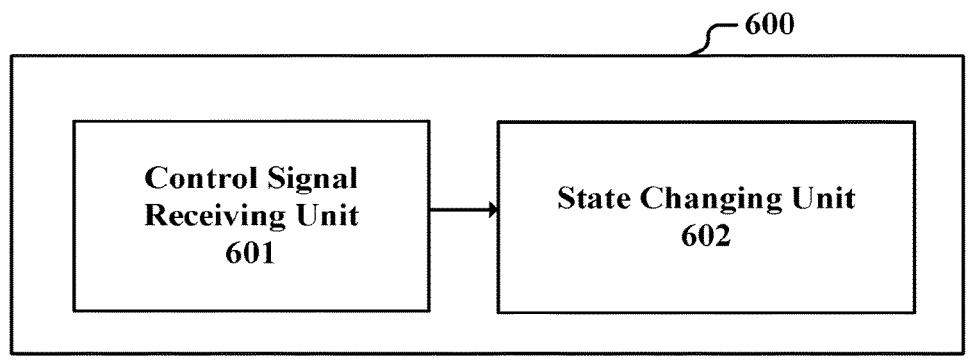
FIG. 13 is a structural block diagram of the apparatus for changing the operation state of a small cell according to an embodiment of the present application.

As shown in FIG. 13, the apparatus 600 for changing operation state of a small cell according to an embodiment of the present application includes: a control signal receiving unit 601, configured to receive a control signal from the above mentioned apparatus for controlling a change of operation state of a small cell (any one of apparatus 100 and 300 to 500, referred as "apparatus for controlling" herein-after); and a state changing unit 602, configured to change, based on the control signal, the operation state of the small cell.

The implementation scheme of the control signal has been described in particular in the first embodiment, and will not be repeated here. The state changing unit 602 changes the sleep level of the small cell according to the control signal, for example, increases the sleep level by one level, changes the sleep level to the sub-frame sleep or the like.

The Eighth Embodiment

Figure 14:
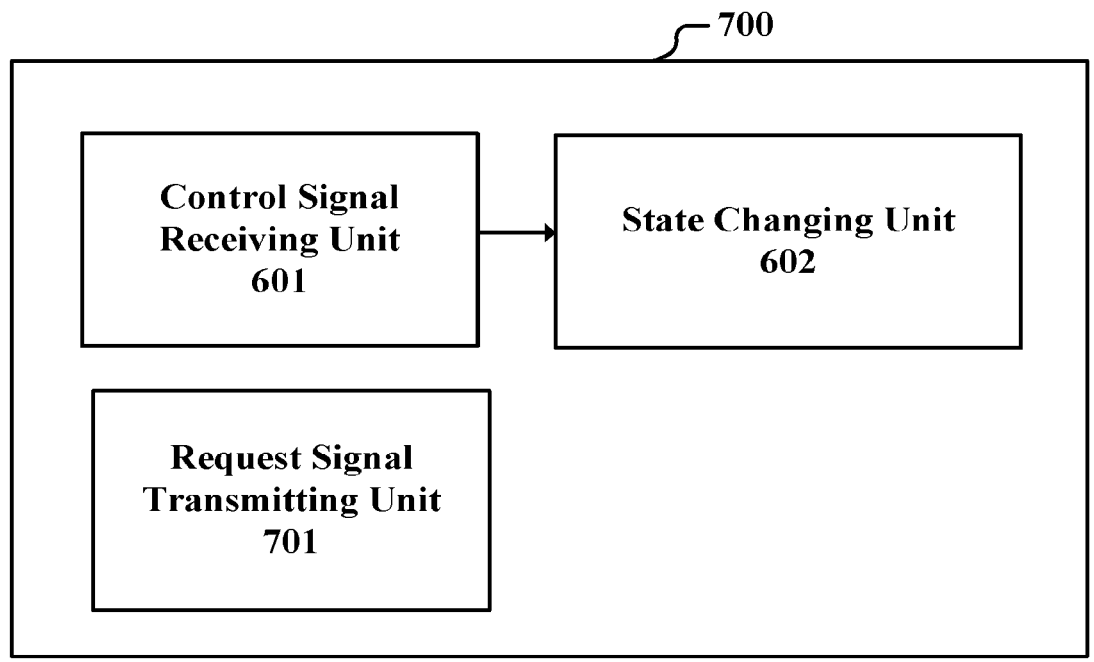
FIG. 14 is a structural block diagram of the apparatus for changing the operation state of a small cell according to another embodiment of the present application.

As shown in FIG. 14, besides the units in apparatus 600 described in the seventh embodiment with reference to FIG. 13, the apparatus 700 for changing operation state of a small cell according to another embodiment of the present application further includes: a request signal transmitting unit 701, configured to transmit a request signal including the change of the operation state to be performed to the apparatus for controlling (such as the apparatus 500), wherein, the control signal receiving unit 601 is configured to receive a control signal which is a reply to the request signal from the apparatus for controlling; and the state changing unit 602 is configured to change, based on the replied control signal, the operation state of the small cell.

The present embodiment is distinguished from the seventh embodiment in that, the small cell judges whether to change the operation state at first, and then in the case of requiring to change, transmits a request to the apparatus for controlling. Preferably, the request contains adjusting suggestion of sleep level, relevant interference or load conditions. The apparatus for controlling uses the relevant interference and/or load conditions therein to perform the above mentioned related processing, and then transmits the obtained controlling signal as the reply to the control signal receiving unit 601. In another implementation, it can be set as follows: when the reply and the request are identical, it means that the apparatus for controlling permits the change requested by the small cell; while when the reply and the request are different from each other, it means that the apparatus for controlling corrects the change requested by the small cell, and the small cell should perform the change of operation state according to the received reply. In addition, if no reply is received, it means that the controlling apparatus does not permit change of the operation state, and the small cell maintains its original operation state.

In this embodiment, the change of operation state to be performed transmitted by the apparatus 700 can be determined using a component with similar functions to the information acquiring unit 101 and the state change determining unit 102. In other words, the apparatus 700 can determine the change of operation state to be performed based on the interference between the small cell it is located in and the adjacent small cells, and/or the load of the small cell it is located in or the load to be taken on by the small cell it is located in which is distributed from other cells. It is to be understood that, the apparatus 700 can also adopt other manners to determine the change of operation state to be performed, and the manners are not limited thereto.

The Ninth Embodiment

Figure 15:
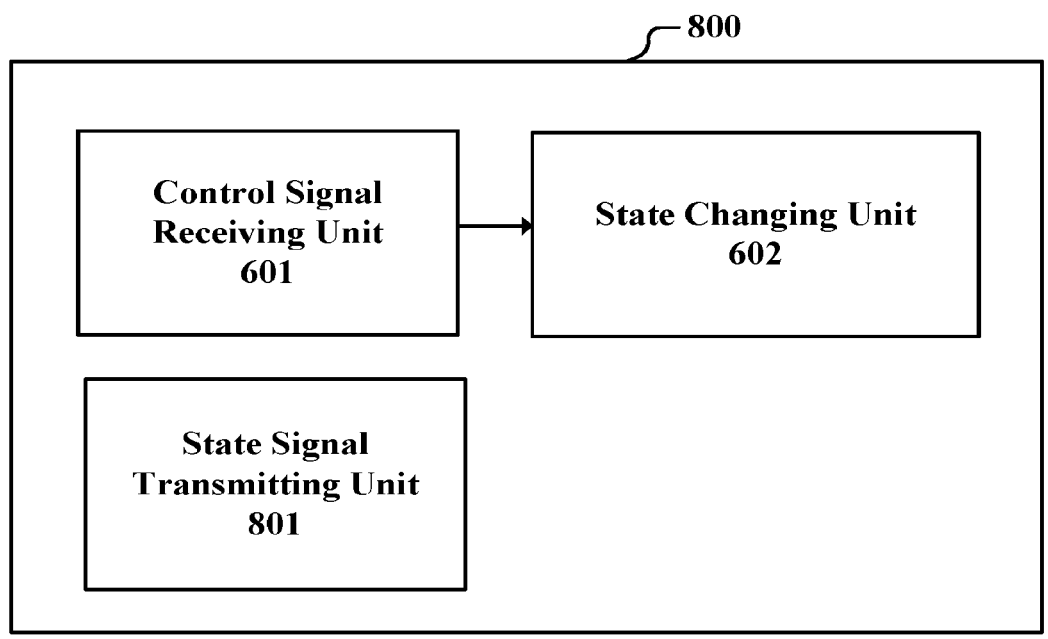
FIG. 15 is a structural block diagram of the apparatus for changing the operation state of a small cell according to still another embodiment of the present application.

As shown in FIG. 15, besides the units in the apparatus 600 described with reference to FIG. 13 in the seventh embodiment, the apparatus 800 for changing operation state of a small cell according to still another embodiment of the present application further includes: a state signal transmitting unit 801, configured to transmit an indication signal indicating the change of the operation state to the above mentioned apparatus for controlling.

In this embodiment, the small cell can change the sleep level on its own, and the apparatus 800 report the change performed to the apparatus for controlling via the state signal transmitting unit 801. At this time, if the apparatus for controlling does not permit such a change, it can transmit back a corresponding control signal, and the apparatus 800 has to obey the command from the apparatus for controlling.

Similar to the eighth embodiment, in this embodiment, the apparatus 800 can determine the change of operation state to be performed using a component with similar functions to the information acquiring unit 101 and the state change determining unit 102. In other words, the apparatus 800 can determine the change of operation state to be performed based on the interference the small cell it is located in produced to the adjacent small cells, and/or the load of the small cell it is located in or the load to be taken on which is distributed from other cells. Similarly, the apparatus 800 can also adopt other manners to determine the change of operation state to be performed, and the manners are not limited thereto.

In addition, although not shown in FIG. 15, the apparatus 600, 700 and 800 according to the seventh embodiment to the ninth embodiment can further include a component for reporting its current sleep level to the apparatus for controlling.

The Tenth Embodiment

During the description of each of the above mentioned apparatus, a base station is substantively provided as well. The base station includes one of the apparatus 100 and 300 to 500 in the first embodiment to the sixth embodiment or one of the apparatus 600 to 800 in the seventh embodiment to the ninth embodiment.

Specifically, the base station of the macro cell or the base station of the small cell serving as the cluster header can include one of the apparatus 100 and 300 to 500, and the base station of the normal small cell can include one of the apparatus 100 and 300 to 800.

The Eleventh Embodiment

It is apparent that some processing or methods are also disclosed in the description above on the apparatus for controlling a change of operation state of a small cell and the apparatus for changing operation state of a small cell according to embodiments of the present invention. Below, the summary of the methods is described without repeating the details which are already discussed above, however, it should be noted that although disclosed in the description of the apparatus for controlling a change of operation state of a small cell and the apparatus for changing operation state of a small cell, the methods do not certainly employ or are not certainly executed by the aforementioned components. For instance, embodiments of the apparatus for controlling a change of operation state of a small cell and the apparatus for changing operation state of a small cell may be partially or completely achieved by hardware and/or firmware, and the method for controlling a change of operation state of a small cell and the method for changing operation state of a small cell described below may be fully achieved by a computer-executable program, although the methods may employ the hardware and/or firmware of the apparatus for controlling a change of operation state of a small cell and the apparatus for changing operation state of a small cell.

Figure 16:
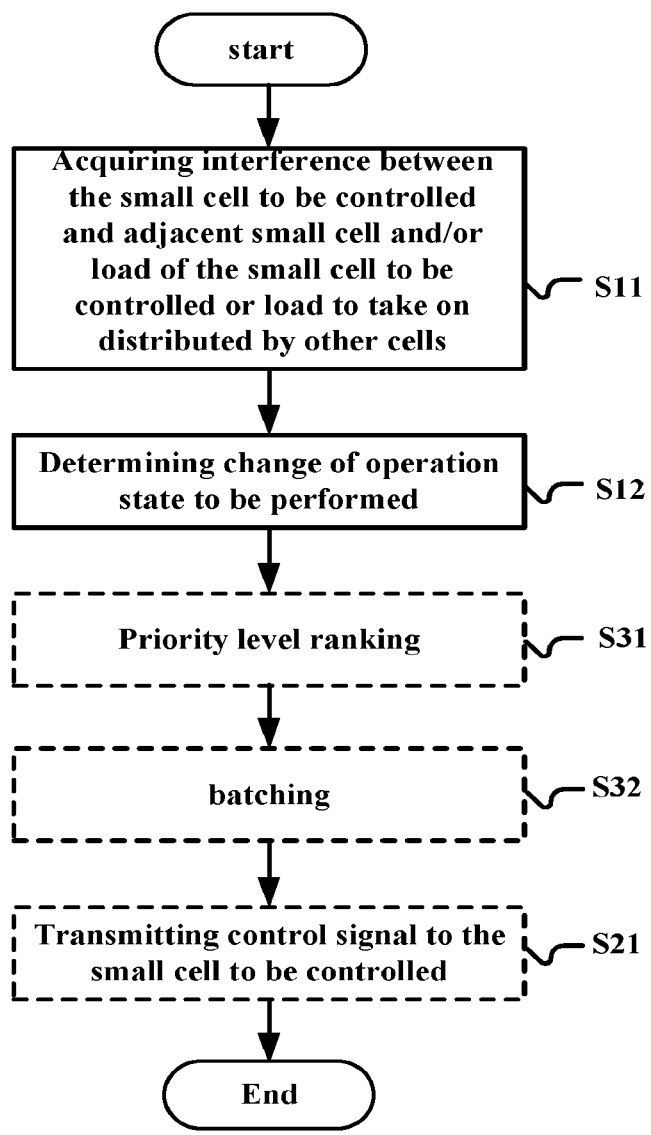
FIG. 16 is a flowchart illustrating the method for controlling a change of operation state of a small cell according to embodiments of the present application.

FIG. 16 shows a flowchart of the method for controlling a change of operation state of a small cell according to embodiments of the present application. The method includes: acquiring interferences between the small cell to be controlled and an adjacent small cell, and/or load of the small cell to be controlled or load to be taken on by the small cell to be controlled which is distributed by other cells (S11); and determining, based on the acquired interferences and/or the load, a change of operation state to be performed by the small cell to be controlled (S12), wherein, the operation state includes multiple sleep levels from low to high, the small cell to be controlled has a lighter degree of sleep when it is at a lower sleep level than when it is at a higher sleep level, the change of operation state being performed among the multiple sleep levels.

As stated above, various kinds of settings for the sleep level can be adopted. The settings include but are not limited to the following example: the sleep level include small cell base station waking up completely, sub-frame sleep, sub-carrier downlink sleep, sub-carrier uplink and downlink sleep, small cell base station downlink sleep and small cell base station uplink and downlink sleep.

In step S11, the number of high-interference user terminals in the adjacent small cell can be acquired to determine a degree of interference the small cell to be controlled produced to the adjacent small cell, wherein, the interferences the high-interference user terminal being subjected to from the small cell to be controlled exceed a predetermined limit.

In an example, in the step S11, whether a user terminal of the adjacent small cell is a high-interference user terminal can be judged based on an uplink signal of the user terminal which has been received by the small cell to be controlled. The uplink signal can be SRS, PRACH or PUSCH, PUCCH.

Figure 17:
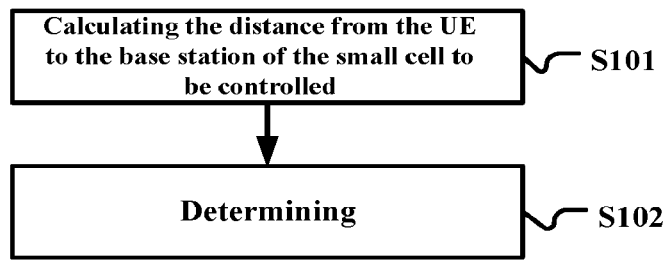
FIG. 17 is a flowchart illustrating an example of sub-steps of the step S11 in FIG. 16.

Specifically, as shown in FIG. 17, the step S11 can include the following sub-steps: calculating a distance from the user terminal to a base station of the small cell to be controlled (S101); and judging the user terminal to be the high-interference user terminal, in the case that a power of the uplink signal is higher than a first predetermined threshold, the distance is smaller than the second predetermined threshold, and the small cell to be controlled makes use of the same spectrum resources as the user terminal does (S102).

In step S101, when the calculation is performed using the uplink signal SRS or PRACH, an uplink time advance (TA) from the user terminal to the base station of the small cell to be controlled is calculated based on the SRS or PRACH, and the distance is estimated according to this time advance. While the calculation is performed using the uplink signal PUSCH or PUCCH, an uplink time advance (TA) of the user terminal is obtained from the base station of its serving small cell, this time advance is added with a time deviation between a timing at which the small cell to be controlled detects the PUSCH/PUCCH signal and an uplink synchronization timing, and the resulting sum is taken as an uplink time advance (TA) from the user terminal to the base station of the small cell to be controlled, so as to estimate the distance according to this time advance. The details of this algorithm have been described in particular in the previous embodiments, and will not be omitted here.

In addition, in the step S11, a degree of interference the small cell to be controlled produced to the adjacent small cell, which is indicated by at least one of signals of OI, HII and RNTP from the adjacent small cell, can also be acquired.

As stated above, the detection of the degree of interference can be performed on the controlling side, and can also be performed on the side of the base station of the small cell to be controlled and reported to the controlling side.

Then, in step S12, it can be determined whether to increase or decrease the sleep level of the small cell to be controlled by one or more levels based on the above degree of interference, wherein, the number of levels to be decreased or increased is determined according to the degree of interference.

For example, it is possible to compare the degree of interference with a first threshold and/or a second threshold which is lower than the first threshold, when the degree of interference is higher than the first threshold, it is determined to increase the sleep level of the small cell to be controlled by one or more levels, and when the degree of interference is lower than the second threshold, it is determined to decrease the sleep level of the small cell to be controlled by one or more levels.

In addition, in step S11, it is also possible to acquire load of the small cell to be controlled or the load to be taken on by the small cell to be controlled which is distributed by other cells. In step S12, the change of operation state to be performed by the small cell to be controlled can be determined based on the acquired load or based on both the acquired interference and the acquired load.

In step S11, it is possible to acquire load of the small cell to be controlled within a predetermined time period, and in step S12, it is determined, based on the load, whether to increase or decrease the sleep level of the small cell to be controlled by one or more levels, wherein, the number of levels to be decreased or increased is determined according to the conditions of the load.

In an example, the number of user terminals with a high signal-to-noise ratio which are served by the small cell to be controlled within the predetermined time period can be acquired so as to determine the load, wherein, the user terminals with a high signal-to-noise ratio are the following ones: the signal-to-noise ratio of an uplink signal which a base station of the small cell to be controlled received from the user terminal exceeds a predetermined threshold.

In another example, user terminals or carriers to be distributed to the small cell to be controlled from other cells can be acquired as the load to be distributed, and it is determined to decrease the sleep level of the small cell to be controlled by one or more levels when the load to be distributed exceeds a predetermined amount. The number of levels to be decreased depends on the amount of the load to be distributed. It is to be noted that, the carriers to be distributed stated herein substantively refer to the user terminals using these carriers.

Figure 18:
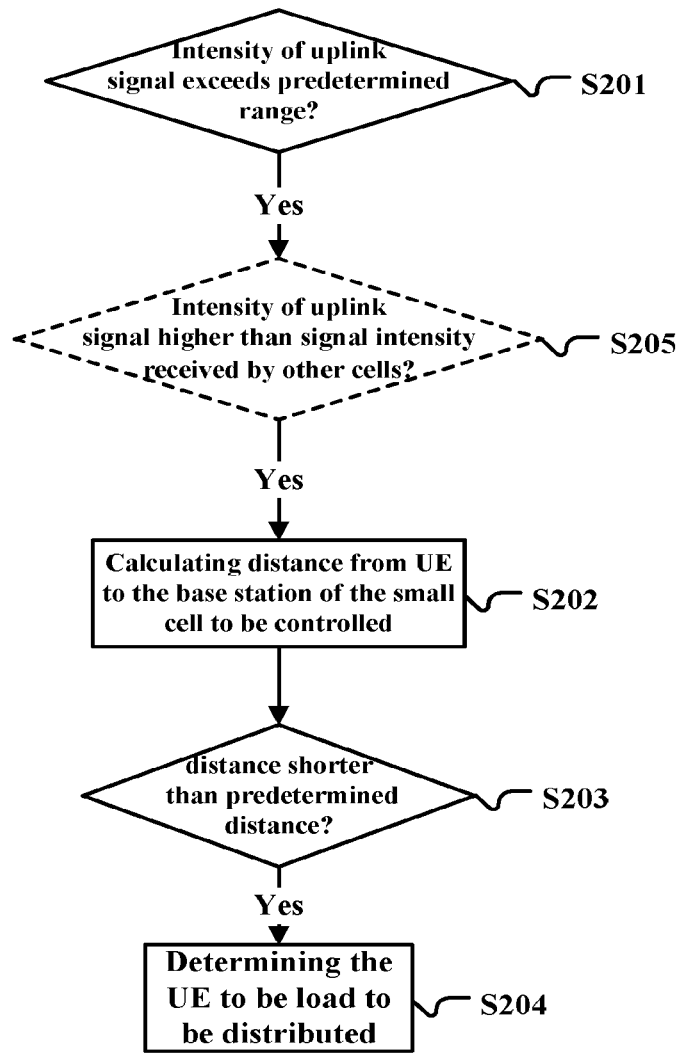
FIG. 18 is a flowchart illustrating another example of sub-steps of the step S11 in FIG. 16.

Specifically, the step S11 can include the following sub-steps, as shown in FIG. 18: judging whether an intensity of the uplink signal from the user terminal of the other cells exceeds a predetermined range (S201); calculating a distance from the user terminal to a base station of the small cell to be controlled, in the case that the intensity of the signal exceeds the predetermined range (S202); and in the case that the distance is shorter than a predetermined distance (S203), determining the user terminal to be the load to be distributed (S204).

The step S11 can further include the following step, which is shown in FIG. 18 in a dashed line block: comparing signal power (i.e., the intensity of the uplink signal) detected by the small cell to be controlled from the user terminal with signal power detected by the other cells from the user terminal to determine whether the former one is higher (S205), and in the case that the comparison result is yes and the above mentioned distance is shorter than a predetermined distance, the user terminal is determined to be the load to be distributed.

The step S11 can further include acquiring the number of carriers of a macro cell to be distributed which cover the small cell to be controlled, wherein, when a PDSCH resource utilizing ratio of a carrier of the macro cell exceeds a predetermined percentage, this carrier is determined to be a carrier to be distributed. In an example, the macro cell can transmit a reference signal on each of the carriers to be distributed, so that the small cell to be controlled detects the number of the received carriers to be distributed by this reference signal.

In addition, although not shown in the Figures, the step S11 can further include each of the sub-steps shown in FIG. 17. Moreover, similarly, the detection of load can be performed on the controlling side, and can also be performed on the side of the base station of the small cell to be controlled and then reported to the controlling side.

When the operation of the steps S11 and S12 is performed on the controlling side, the above mentioned method can further include the following step: transmitting the determined change of operation state as a control signal to the small cell to be controlled, so as to control it to perform the change of operation state (S13), which is shown in FIG. 16 in a dashed line block.

Referring back to FIG. 16, the above method can further include a step S31 which is indicated by a dashed line block: in the case that it is determined there are multiple small cells to be controlled whose operation state is to be changed, ranking priority levels for changing their state. By this step, the small cells to be controlled whose operation states are to be changed at first can be selected according to a certain strategy.

In the step S31, ranking can be performed according to at least one of the following: the load of each small cell to be controlled or the load to be taken on by each small cell to be controlled which is distributed by other cells, the degree of interference each small cell to be controlled produced to its adjacent small cell, the feedback bandwidth or transmission delay between each small cell to be controlled and a macro cell, and the number of user terminals which use the carrier of each small cell to be controlled as the primary component carrier and the number of user terminals with double connections of connecting a base station of a macro cell and the small cell to be controlled.

In the case of ranking according to the above mentioned four aspects, the priority degree for the above mentioned four aspects can be set to be decreasing in order. Of course, other settings can also be adopted, and the example is not limiting.

As shown by another dashed line block in FIG. 16, the above method can further include a step S32: changing, according to the acquired ranking, the operation state of each small cell to be controlled in batches, wherein, each unit in said apparatus re-perform corresponding operations after the operations state of each batch of the small cells to be controlled are changed.

The respective steps of the method for controlling a change of operation state of a small cell have been described with reference to FIG. 16 to FIG. 18 in the above. The specific details can be with reference to the previous description for the apparatus. In the following, the method for changing operation state of a small cell will be briefly described with reference to FIG. 19.

Figures 19, 20:
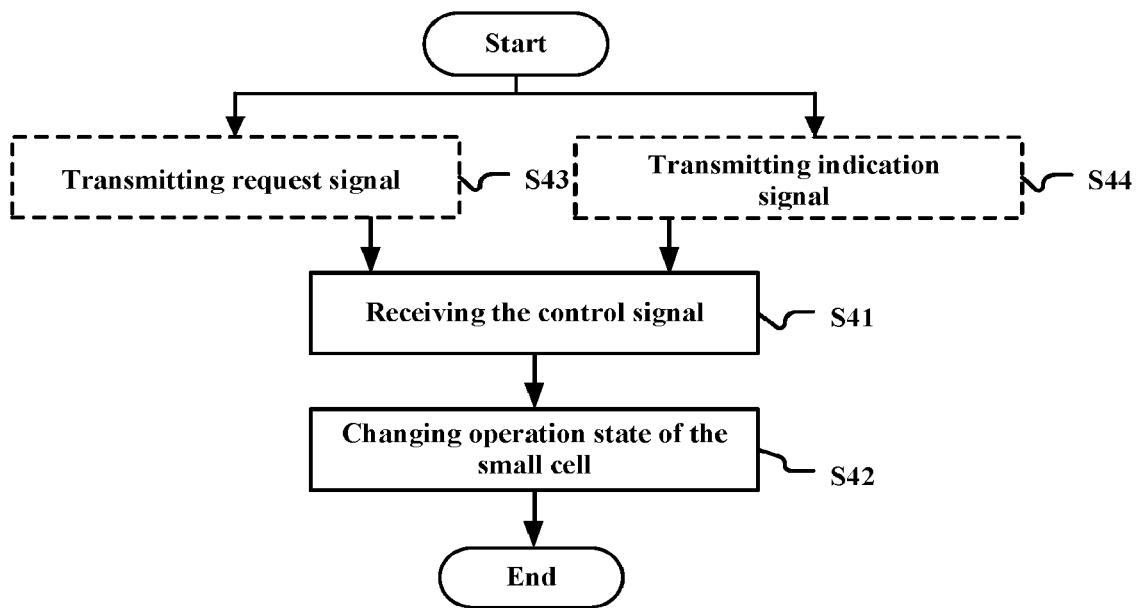
FIG. 19 is a flowchart illustrating the method for changing the operation state of a small cell.
FIG. 20 shows the interference list in an system instance.

As shown in FIG. 19, the method includes: receiving a control signal from the apparatus for controlling (S41); and changing, based on the control signal, the operation state of the small cell to be controlled. The apparatus for controlling can be the above mentioned apparatus for controlling a change of operation state of a small cell. In such a situation, the small cell side receives the control signal from the apparatus for controlling passively.

In addition, the method can further include a step S43: transmitting an indication signal indicating the change of the operation state to be performed to the apparatus for controlling. In such a situation, the small cell side detects the change of operation state to be performed by itself at first, transmits the corresponding request signal to the apparatus for controlling, receives a control signal as a reply from the apparatus for controlling, and changes the operation state of the small cell based on the control signal.

As another example, the method can further include a step S44: transmitting an indication signal indicating the change of operation state to the apparatus for controlling. In such a situation, the small cell changes its operation state on its own, transmits the indication signal indicating such a change to the apparatus for controlling. If the apparatus for controlling does not permit such a change, it will transmit a control signal indicating how to change and the small cell should change the operation state again based on the control signal.

Note that, in the present application, the change of operation state of the small cell actually refers to the change of the sleep level of the small cell base station, unless specified particularly.

In order to facilitate the understanding of the above method, an exemplary system embodiment is given in the following with reference to the application scenario of FIG. 1 and the lists in FIG. 20 and FIG. 21, to describe how to implement the method of changing the sleep level of the small cell base stations by grading and in batches.

Each small cell base station detects the uplink signal. For example, the small cell base station Z detects that the user UEa of the adjacent small cell A is a high-interference user. That is, the power of the uplink signal received by the base station Z from the user UEa exceeds a certain value and the distance from UEa to the base station Z (the method based on the TA measurement described in the previous embodiment can be adopted.) is shorter than a certain distance, and thus it is judged that the user UEa is a high-interference user of the base station Z. Since the interference is mutual, it can also be judged that the user UEa produces high interference to the base station Z. Such kind of information is reported to the apparatus for controlling, thereby generating the interference list shown in FIG. 20.

As shown in FIG. 20, capital letters A-Z are used to denote small cell base stations and small cells in the controlling range, and small letters a-z are used to denote user terminals of the small cells. The interference lists shown in FIG. 20 and FIG. 21 can be stored for example in the above mentioned apparatus for controlling, and can also be stored in a separate storage device. Small cells whose sleep level is to be changed are selected using this interference list.

As can be seen from FIG. 20, as a high-interference small cell whose user terminals produce high interference to other small cells, A is reported 4 times, B is reported 3 times, C is reported 3 times, D is reported twice, E is reported twice, and F is reported once. The base station being reported the most times produces most serious interference to other small cells, and thus be provided with the highest priority level of increasing the sleep level, i.e., A>B=C>D=E>F. The adjacent base station subjected to the interference from the base station most seriously will become the preferred distributing destination to which the base station release its load after the base station sleeps. Therefore, when making the decision of increasing the sleep level of the base station, the distributed load to be taken on by this adjacent base station can be pre-estimated according to the decision, and thus it can be determined to decrease the sleep level of the adjacent base station as well as the priority level of decreasing the sleep level thereof simultaneously. That is, the base station Z reports about A the most times, and the priority level of decreasing the sleep level of Z is highest. The base station V reports about B the most times, and the priority level of decreasing the sleep level of V is the second highest. As so on, the priority level of decreasing sleep level is: Z>V=S>P=M>K.

The scheme of sleep level is changed by grading and in batches. The sleep level of two base stations is increased and the sleep level of two base stations is decreased first. The base stations whose sleep level is to be increased is A, B and C, and the base stations whose sleep level is to be decreased is Z, V and S. It is necessary to compare the priority level of B, C and V, S. The number of the high-interference UEs of B is more than that of C, and the priority level of increasing the sleep level of B is higher than that of C.

In the case of increasing the sleep level of B and C, V and S which are base stations subjected to the most serious interferences from them will take on the same amount of distributed load. Thus, the number of carriers to be distributed of the macro cell covering the small cell is further compared. At this time, the macro cell has 5 carriers, among which 3 carriers has a PDSCH resource utilization ratio beyond the threshold and are carriers to be distributed. V receives 3 carriers to be distributed, and S receives 1 carrier to be distributed. Therefore, the priority level of decreasing the sleep level of V is higher than that of S. Consequently, the sleep level of the base stations A and B is increased and the sleep level of the base stations Z and V is decreased.

For example, the apparatus for controlling can transmit the control signal "0" to the base stations A and B, and transmit the control signal "1" to the base stations Z and V. After receiving the control signal, each base station performs the action of increasing the sleep level by one level or decreasing the sleep level by one level correspondingly.

Then, the interference list is detected again. At this time, the interference list is as shown in FIG. 21. C is reported 3 times, A is reported twice, D is reported twice, E is reported twice, and F is reported once. Therefore, the priority level of increasing the sleep level is: C>A=D=E>F, and the priority level of decreasing the sleep level is: S>X=P=M>K.

Similarly, according to the scheme of changing the sleep level by grading and in batches, the sleep level of two base station is increased and the sleep level of two base stations is decreased first. The base stations whose sleep level is to be increased is C, A, D and E, and the base stations whose sleep level is to be decreased is S, X, P and M. It is necessary to compare the priority level of A, D, E and X, P, M respectively. The number of the high-interference UEs of B is more than that of C, and the priority level of increasing the sleep level of B is higher than that of C.

The number of high-interference UEs is the same for A, D and E. Further, the number of primary serving cell users, i.e., the number of users which use the carrier provided by this cell as the primary component carrier, is compared. When the number of users who take the base station A as a primary cell is 5, the number of users who take the base station D as a primary cell is 5, and the number of users who take the base station E as a primary cell is 10, the priority level of increasing the sleep level is C>A=D>E. Then the transmission delay is compared. When the average value of the feedback delay between the base station A and the adjacent cell is 50 μs, and the average value of the feedback delay between the base station D and the adjacent cell is 20 μs, the priority level of increasing the sleep level is C>A>D>E. Therefore, the sleep level of the base station C and base station A is increased.

The numbers of high-interference UEs of X, P and M are the same as well. The number of carriers to be distributed of the macro cell covering the small cell is further compared. At this time, the macro cell still has 3 carriers to be distributed. X receives 3 carriers to be distributed, P receives 3 carriers to be distributed, and M receives 1 carrier to be distributed. Therefore, the priority level of decreasing the sleep level is: S>X=P>M. The number of users with a high signal to noise ratio (SNR) is further compared. The cell X has 30 users with a high SNR therein, and the cell P has 15 users with a high SNR therein. Thus, the priority level of decreasing the sleep level is S>X>P>M. Consequently, the sleep level of the base stations S and X is decreased.

The apparatus for controlling transmits the control signal "0" to the base stations C and A, and transmits the control signal "1" to the base stations S and X. After receiving the control signal, each base station performs the action of increasing the sleep level by one level or decreasing the sleep level by one level correspondingly.

Then, the above mentioned operations are repeated until the interference list is empty.

It should be understood that although the system embodiment is described herein as an example, the specific implementation of the present application is not limited thereto, instead, it can adopt various manners described above in each embodiment.

In conclusion, by changing the sleep level of the small cell to be controlled according to its interference and/or load conditions, the apparatus and method of the present application can reduce the energy consumption while ensuring the communication quality as much as possible.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 2200 shown in FIG. 22) from a storage medium or network, wherein the computer is capable of implementing various functions when installed with various programs.

Figures 21, 22:
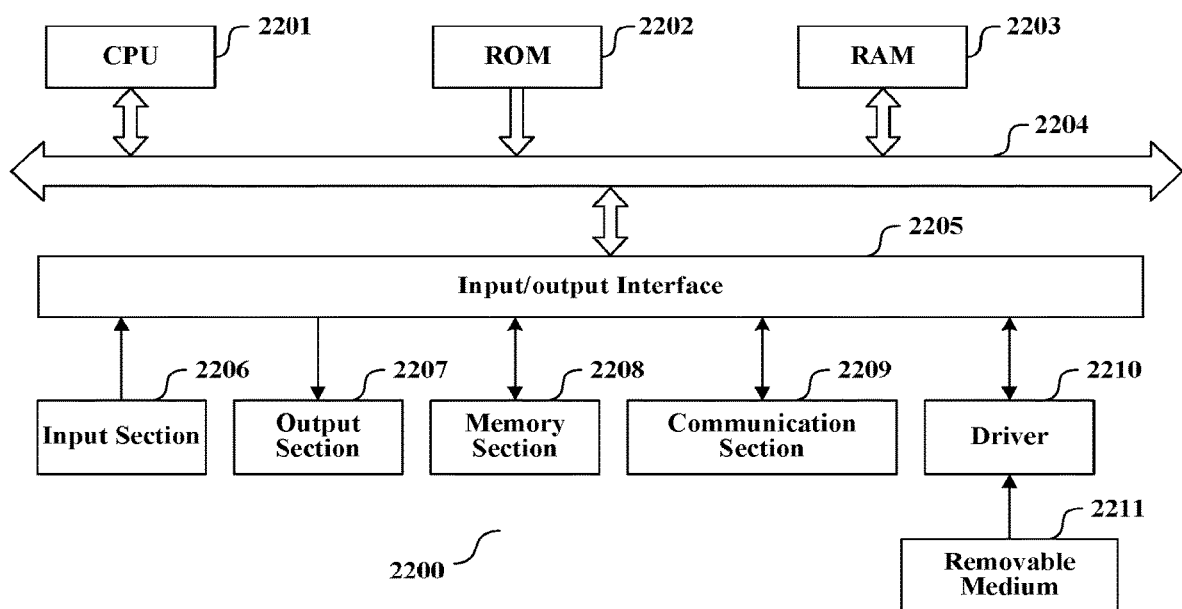
FIG. 21 shows another interference list in an system instance.
FIG. 22 is an exemplary block diagram illustrating the structure of a general purpose personal computer capable of realizing the method and/or apparatus and/or system according to the embodiments of the present invention.

In FIG. 22, a computing processing unit (CPU) 2201 executes various processing according to a program stored in a read-only memory (ROM) 2202 or a program loaded to a random access memory (RAM) 2203 from a storage section 2208. The data needed for the various processing of the CPU 2201 may be stored in the RAM 2203 as needed. The CPU 2201, the ROM 2202 and the RAM 2203 are linked with each other via a bus 2204. An input/output interface 2205 is also linked to the bus 2204.

The following components are linked to the input/output interface 2205: an input section 2206 (including keyboard, mouse and the like), an output section 2207 (including displays such as a cathode ray tube (CRT), a liquid crystal display (LCD), a loudspeaker and the like), a storage section 2208 (including hard disc and the like), and a communication section 2209 (including a network interface card such as a LAN card, modem and the like). The communication section 2209 performs communication processing via a network such as the Internet. A driver 2210 may also be linked to the input/output interface 2205, if needed. If needed, a removable medium 2211, for example, a magnetic disc, an optical disc, a magnetic optical disc, a semiconductor memory and the like, may be installed in the driver 2210, so that the computer program read therefrom is installed in the memory section 2208 as appropriate.

In the case where the foregoing series of processing is achieved through software, programs forming the software are installed from a network such as the Internet or a memory medium such as the removable medium 2211.

It should be appreciated by those skilled in the art that the memory medium is not limited to the removable medium 2211 shown in FIG. 22, which has program stored therein and is distributed separately from the apparatus so as to provide the programs to users. The removable medium 2211 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2202 and the storage section 2208 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An apparatus for controlling a change of an operation state of a first cell, comprising:
   circuitry configured to:
   acquire information indicating interferences between the first cell and second cell adjacent to the first cell, and at least one of a first load status of the first cell or a second load status of the second cell; and
   determine the change of the operation state to be performed by the first cell based on the information,
   wherein the circuitry is configured to switch among different operation states including an on state, a partial sub-frame off state and a downlink transmission off state to change the operation state of the first cell,
   wherein in the on state, all sub-frames of the first cell are available for data transmission, in the partial sub-frame off state, a part of sub-frames of the first cell are not available for data transmission, while in the downlink transmission off state, all the downlink sub-frames of the first cell are not available for data transmission.

2. A base station, comprising the apparatus according to claim 1.

3. A method for controlling a change of an operation state of a first cell, comprising:
   acquire information indicating interferences between the first cell and a second cell adjacent to the first cell, and at least one of a first load status of the first cell or a second load status of the second cell;
   determine the change of the operation state to be performed by the first cell based on the information; and
   switch among different operation states including an on state, a partial sub-frame off state and a downlink transmission off state to change the operation state of the first cell,
   wherein in the on state, all sub-frames of the first cell are available for data transmission, in the partial sub-frame off state, a part of sub-frames of the first cell are not available for data transmission, while in the downlink transmission off state, all the downlink sub-frames of the first cell are not available for data transmission.

4. The apparatus according to claim 1, wherein the circuitry is configured to receive a X2 signaling from a base station of the second cell to acquire the interferences between the first cell and the second cell.

5. The apparatus according to claim 4, wherein the circuitry is configured to read overload indication in the X2 signaling to acquire the interferences between the first cell and the second cell for determining the change of the operation state to one of the on state, the partial sub-frame off state and downlink transmission off state.

6. The apparatus according to claim 4, wherein the circuitry is configured to read Relative Narrowband Tx Power in the X2 signaling to acquire the interferences between the first cell and the second cell for determining the change of the operation state to one of the on state, the partial sub-frame off state and downlink transmission off state.

7. The apparatus according to claim 4, wherein the circuitry is configured to, based on the X2 signaling, identify user equipment in the second cell which is interfered by the first cell to determine the change of the operation state.

8. The apparatus according to claim 1, wherein the first cell is a small cell.

9. The apparatus according to claim 1, wherein the apparatus is implemented as a base station.

* * * * *